(12) United States Patent
Yang et al.

(10) Patent No.: US 12,250,156 B2
(45) Date of Patent: Mar. 11, 2025

(54) SYSTEMS AND METHODS FOR DATA RATE ADAPTATION BASED ON RADIO ACCESS NETWORK RECOMMENDATIONS

(71) Applicant: Verizon Patent and Licensing Inc., Basking Ridge, NJ (US)

(72) Inventors: Jin Yang, Orinda, CA (US); Susan Wu Sanders, Bridgewater, NJ (US); Shuang Echo Yang, Naperville, IL (US); Francisco X. Sevilla R., Eden Prairie, MN (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/167,372

(22) Filed: Feb. 10, 2023

(65) Prior Publication Data
US 2024/0275731 A1    Aug. 15, 2024

(51) Int. Cl.
*G06F 15/16* (2006.01)
*H04L 47/25* (2022.01)
*H04L 47/283* (2022.01)

(52) U.S. Cl.
CPC ............ *H04L 47/25* (2013.01); *H04L 47/283* (2013.01)

(58) Field of Classification Search
CPC .............................. H04L 47/25; H04L 47/283
See application file for complete search history.

(56) References Cited

U.S. PATENT DOCUMENTS

| | | | | |
|---|---|---|---|---|
| 8,363,564 | B1 * | 1/2013 | Talley | H04W 52/267 370/252 |
| 2015/0304939 | A1 * | 10/2015 | Liu | H04W 40/12 370/232 |
| 2021/0306898 | A1 * | 9/2021 | Xu | H04L 65/612 |
| 2022/0217560 | A1 * | 7/2022 | Kumar | H04W 24/10 |
| 2023/0308218 | A1 * | 9/2023 | Dimou | H04L 1/0003 |

* cited by examiner

*Primary Examiner* — John B Walsh

(57) ABSTRACT

In some implementations, a radio access network (RAN) may obtain data rate information from a server device. The server device may be associated with an application and the data rate information may be associated with the application. The RAN may determine, based on the data rate information, one or more data rate parameters associated with the application. The one or more data rate parameters may include at least one of one or more radio frequency parameters, one or more network loading parameters, one or more mobility parameters, or an available data rate parameter. The RAN may transmit, to the server device, the one or more data rate parameters.

20 Claims, 7 Drawing Sheets

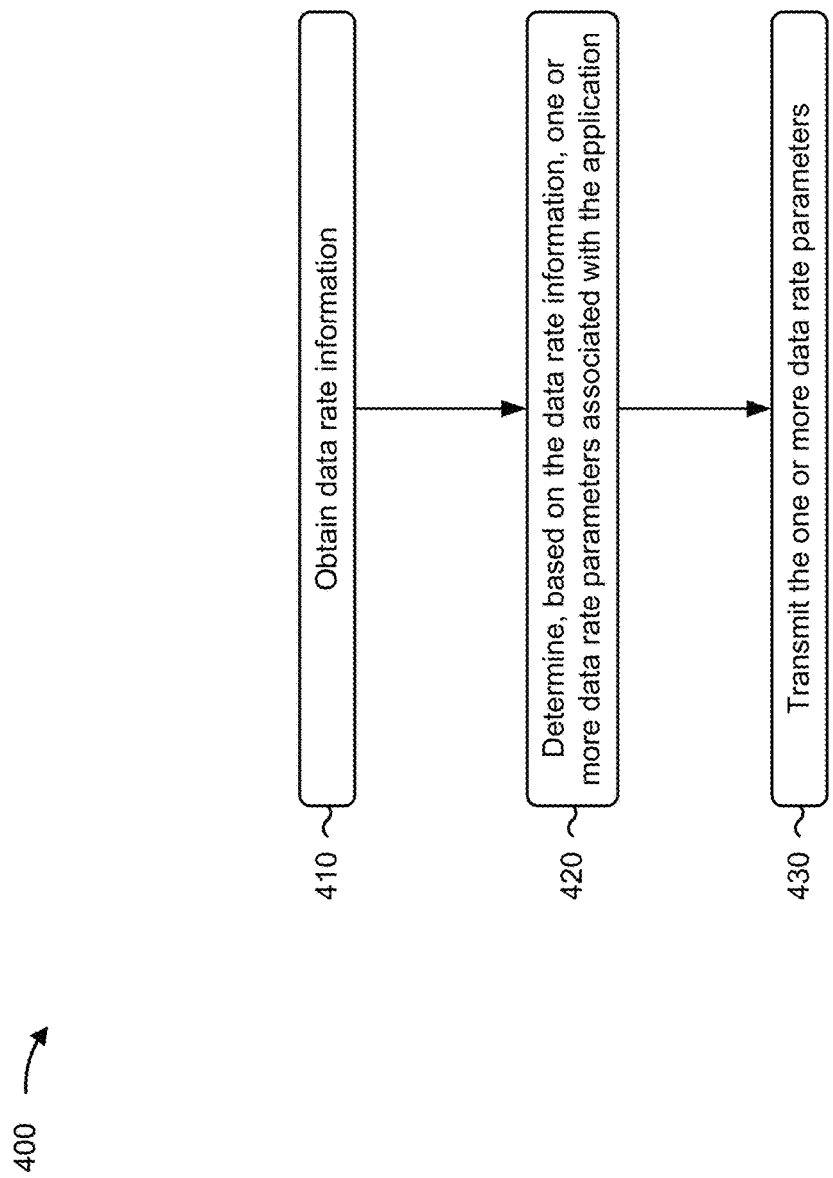

SYSTEMS AND METHODS FOR DATA RATE ADAPTATION BASED ON RADIO ACCESS NETWORK RECOMMENDATIONS

BACKGROUND

Data rate adaptation may be used to adapt a data rate, such as a data rate associated with streaming media. For example, data rate adaptation may be used to increase or decrease a data rate associated with the streaming media based on network conditions associated with the streaming media.

BRIEF DESCRIPTION OF THE DRAWINGS

FIG. 4 is a flowchart of an example process associated with data rate adaptation based on RAN recommendations.

DETAILED DESCRIPTION OF EXAMPLE EMBODIMENTS

Figure 1A:
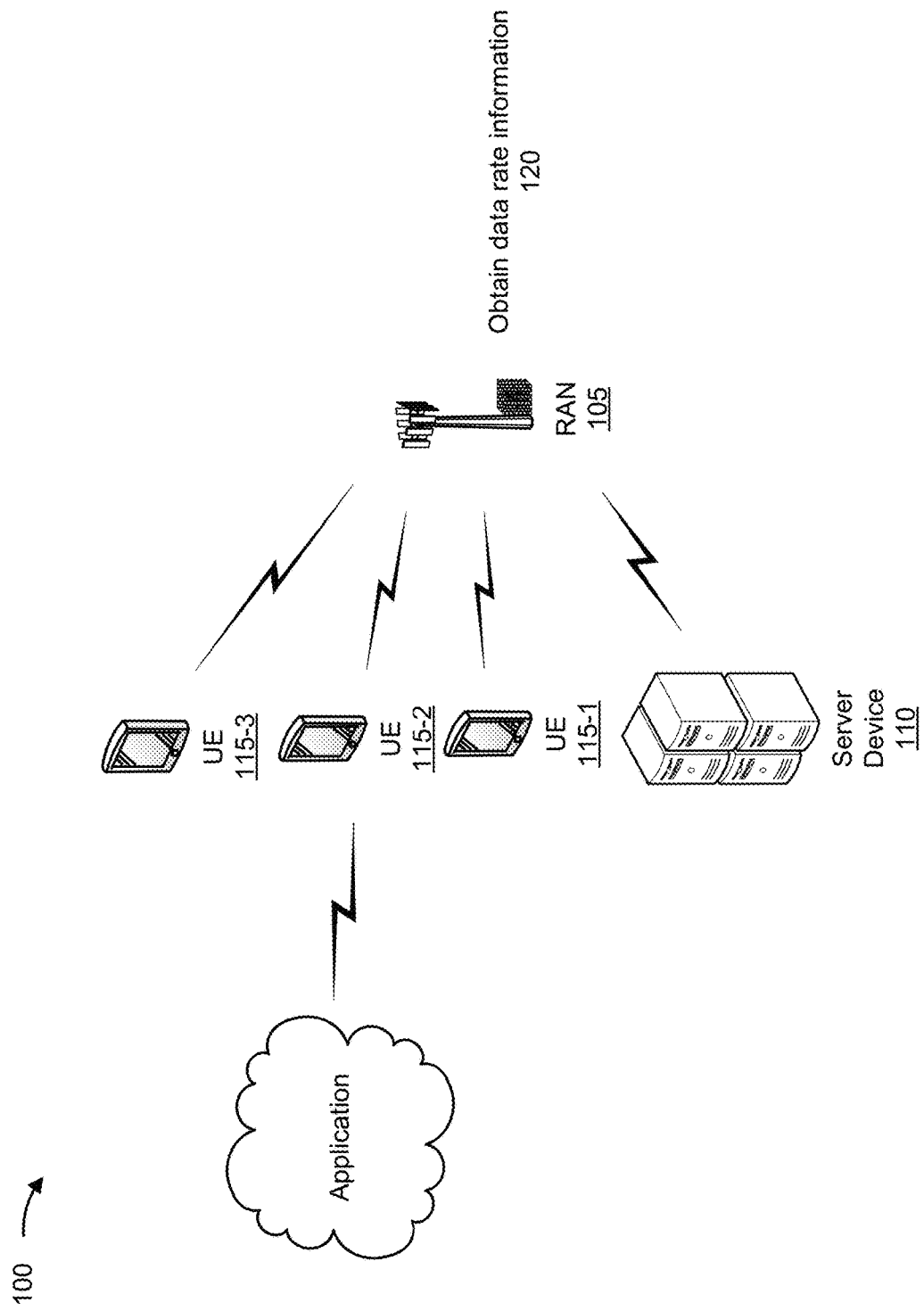
FIGS. 1A-1D are diagrams of an example associated with data rate adaptation based on radio access network (RAN) recommendations.

The following detailed description of example implementations refers to the accompanying drawings. The same reference numbers in different drawings may identify the same or similar elements.

A server device, such as an application server (e.g., a cloud server), may use a data rate control technique to control a data rate associated with an application, such as an application that is executed on a user equipment (UE) via an application client. For example, the server device may use the data rate control technique to maintain one or more quality of service (QoS) requirements associated with the application, such as a low latency requirement, a bit rate requirement, or a throughput requirement.

In some cases, the server device may calculate network performance measurements between the server device and the UE (e.g., end-to-end measurements), such as a latency measurement, a packet performance measurement, and/or a bit rate measurement, and may adjust the data rate associated with the application based on the network performance measurements. However, delays associated with end-to-end measurements (e.g., processing delays, queueing delays, transmission delays, and/or propagation delays) and/or changing network conditions can negatively affect the adjustments to the data rate (e.g., performed by the server device). As an example, because the delays associated with the end-to-end measurements and/or the network conditions typically vary over time, the adjustments to the data rate can be inaccurate and/or ineffective because the adjustment to the data rate may not be applicable to current delays associated with data being transmitted and/or current network conditions.

In some cases, the server device may determine whether to increase or decrease the data rate based on estimating an available bandwidth associated with the data rate. However, because packet performance typically varies over time, the server device can overestimate or underestimate the available bandwidth associated with the data rate (e.g., because of outlier packet performance measurements). As an example, if the server device overestimates the available bandwidth associated with the data rate based on a packet performance measurement that indicates an outlier delay time (e.g., the delay time associated with the packet performance measurement is less than an average delay time of subsequent packets that are transmitted), then the server device can increase the data rate based on the overestimated available bandwidth. As a result, congestion (e.g., network congestion) and/or packet loss may increase, which causes the server device to retransmit data associated with the packet loss and/or causes the application to stall and/or to reset.

As another example, if the server device underestimates the available bandwidth associated with the data rate based on a packet performance measurement that indicates an outlier delay time (e.g., the delay time associated with the packet performance measurement is greater than an average delay time of subsequent packets that are transmitted), the server device can decrease the data rate based on the underestimated bandwidth. As a result, the server device may underutilize (e.g., waste) an available resource, such as an available bandwidth radio resource, which causes the QoS associated with the application to decrease (e.g., a quality associated with data being transmitted decreases).

Thus, some mechanisms for providing data rate control consume computing resources, processing resources, memory resources, communication resources, networking resources, and/or other resources associated with delays associated with end-to-end measurements, changing network conditions, and/or incorrect estimations of available bandwidth associated with the data rate (e.g., by frequently adjusting the data rate because of the delays, by retransmitting data associated with packet loss, and/or by unnecessarily adjusting the data rate). Furthermore, because some mechanisms for providing data rate control are based on end-to-end measurements, the adjustments to the date rate (e.g., performed by the server device) are limited to the characteristics associated with the end-to-end measurements. As a result, other factors that may affect adjustments to the data rate cannot be implemented by the server device.

Some implementations described herein provide data rate adaptation based on communications between a radio access network (RAN) and a server device rather than data rate adaptation based on end-to-end communications (e.g., end-to-end measurements). For example, the RAN and the server device may exchange data rate information and/or application information associated with an application. As an example, the RAN may calculate one or more data rate parameters associated with the application and/or the server device may obtain one or more application parameters associated with the application. The RAN and/or the server device may calculate an available data rate associated with the application based on the one or more data rate parameters and/or the one or more application parameters. The server device may adjust a data rate associated with the application based on the available data rate.

In this way, the implementations described herein consume fewer computing resources, processing resources, memory resources, communication resources, networking resources, and/or other resources that would otherwise have been consumed in frequently adjusting the data rate because of delays associated with end-to-end measurements, retransmitting data associated with packet loss, and/or by unnecessarily adjusting the data rate.

Furthermore, a greater number of factors that may affect the data rate associated with the application may be considered relative to factors limited to factors associated with only end-to-end measurements. For example, the implementations described herein may consider factors, such as radio condition factors (e.g., radio frequency (RF) condition factors), loading factors (e.g., network loading factors), and/or mobility factors, that are typically not available through only end to end measurements. As a result, the implementations described herein may more efficiently utilize resources, such as an available bandwidth radio resource, and/or may more accurately determine a data rate.

FIGS. 1A-1D are diagrams of an example 100 associated with data rate adaptation based on RAN recommendations. As shown in FIGS. 1A-1D, example 100 includes a RAN 105 (e.g., a base station), a server device 110, and a number of UEs 115-1 to 115-3 (collectively referred to herein as UEs 115).

As shown in FIG. 1A, and by reference number 120, the RAN 105 may obtain data rate information. For example, the RAN 105 may be communicably coupled to the server device 110 and/or the UEs 115 and may obtain the data rate information based on communications with the server device 110 and/or communications with the UEs 115. In some implementations, the data rate information may include RF information, network loading information, mobility information, and/or available data rate information.

For example, the RF information may include signal-to-interference-noise ratio (SINR) information, reference signal received power (RSRP) information, and/or reference signal received quality (RSRQ) information. The SINR may be associated with a power of a particular signal, such as a particular signal transmitted by the RAN 105, divided by a sum of an interference power (e.g., based on interfering signals) and a noise power (e.g., background noise). The RSRP may be associated with a received power of a particular signal, such as a particular signal transmitted by the RAN 105. The RSRQ may be associated with a received quality of a particular signal, such as a particular signal transmitted by the RAN 105.

In some implementations, one or more of the UEs 115 may obtain SINR data, RSRP data, and/or RSRQ data, such as by performing SINR measurements, RSRP measurements, and/or RSRQ measurements on one or more signals transmitted by the RAN 105. As an example, the SINR measurements may be indicated as SINR values, the RSRP measurements may be indicated as RSRP values, and/or the RSRQ values may be indicated as RSRQ values. In some implementations, a UE 115 may transmit one or more SINR values, one or more RSRP values, and/or one or more RSRQ values to the RAN 105. The RAN 105 may use one or more SINR values, one or more RSRP values and/or one or more RSRQ values from a single UE 115 or from multiple UEs 115 to determine the RF information (e.g., an SINR value, an RSRP value, an RSRQ value, an average SINR value, an average RSRP value, and/or an average RSRQ value).

In some implementations, the network loading information may include UE information (e.g., a number of UEs that are communicably coupled to the RAN 105), network connection information (e.g., a number of network connections associated with the RAN 105), and/or physical resource block (PRB) utilization information associated with the RAN 105. As an example, the RAN 105 may detect the number of UEs communicably coupled to the RAN 105, may detect the number of network connections communicably coupled to the RAN 105, and/or may detect a number of PRBs utilized by one or more of the UEs (e.g., UEs 115) communicably coupled to the RAN 105. A UE 115 may be communicably coupled to the RAN 105 if the UE 115 has connected to the RAN 105 using a network connection procedure, such as a radio resource control (RRC) connection procedure.

In some implementations, the mobility information may include radio access technology (RAT) information, UE speed information, handover information, dual connectivity (DC) information, and/or carrier aggregation (CA) information. As an example, the RAN 105 may obtain the RAT information by identifying the RATs that the RAN 105 uses to transmit data to UEs 115, such as a Long Term Evolution (LTE) RAT, a 4G RAT, a New Radio RAT, and/or a 5G RAT. Additionally, or alternatively, one or more of the UEs 115 may the obtain RAT information based on receiving information, such as a system information block (SIB), from the RAN 105, and the one or more UEs 115 may transmit the RAT information to the RAN 105.

The UE speed information may include a UE speed value associated with one or more of the UEs 115. For example, one or more UEs 115 may calculate the UE speed value associated with the one or more UEs 115 based on global positioning system (GPS) data obtained by the one or more UEs 115. A UE 115 may transmit UE speed information for that UE 115 to the RAN 105. As another example, the RAN 105 may determine the UE speed value associated with the one or more UEs 115 based on doppler shift data associated with the one or more UEs 115. In some implementations, the RAN 105 may categorize the UE speed value associated with the one or more UEs 115 into a range (e.g., a high UE speed range, a middle UE speed range, and/or a low UE speed range).

In some implementations, the handover information may be associated with a number of handover successes associated with the coverage area of the RAN 105, such as a number of times that the UEs 115 successfully enter the coverage area and/or successfully changed a frequency in the coverage area. As an example, the RAN 105 may obtain the handover information by detecting the number of handover successes associated with the coverage area of the RAN 105.

In some implementations, the DC information may include information associated with a DC status of the UEs 115. For example, the DC status of one or more of the UEs 115 may be "using" to indicate that the one or more of the UEs 115 is currently using DC, the DC status of one or more of the UEs 115 may be "capable" to indicate that the one or more UEs 115 is capable of using DC, and/or the DC status of one or more UEs 115 may be "not capable" to indicate that the one or more of the UEs 115 is not capable of using DC. As an example, a UE 115 may transmit a DC status of that UE 115 to the RAN 105.

In some implementations, the CA information may include information associated with a CA status of the UEs 115. For example, the CA status of one or more of the UEs 115 may be "using" to indicate that the one or more of the UEs 115 is currently using CA, the CA status of one or more of the UEs 115 may be "capable" to indicate that the one or more UEs 115 is capable of using CA, and/or the CA status of one or more UEs 115 may be "not capable" to indicate that the one or more of the UEs 115 is not capable of using CA. As an example, a UE 115 may transmit a CA status of that UE 115 to the RAN 105.

In some implementations, the available data rate information may be based on the RF information, the network loading information, and/or the mobility information. For example, the available data rate information may indicate which information (e.g., the RF information, the network loading information, and/or the mobility information) to use to calculate data the available data rate and/or a manner in which the RF information, the network loading information, and/or the mobility information are to be combined to calculate the available data rate, as described in more detail elsewhere herein.

Figure 1B:
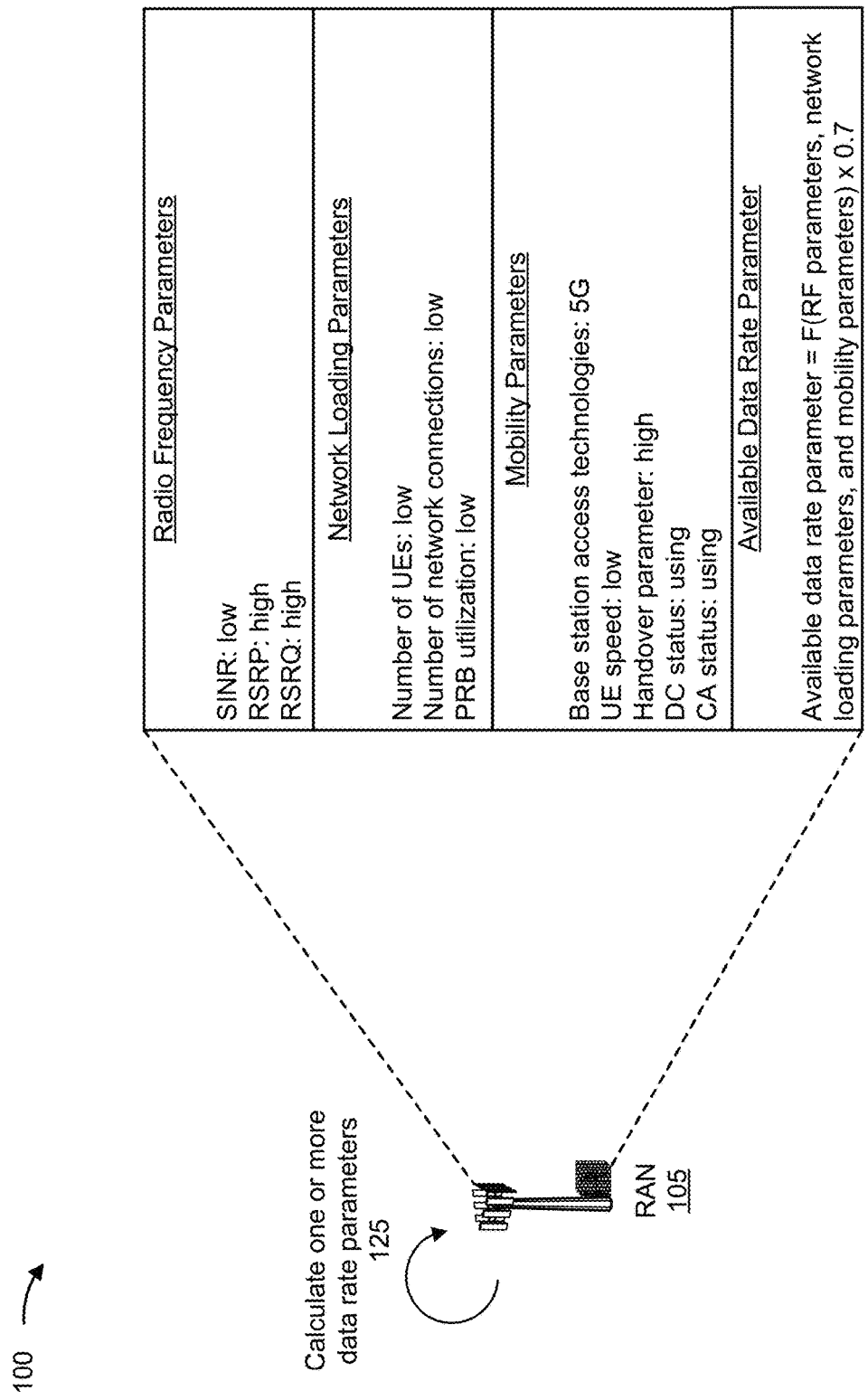

As shown in FIG. 1B, and by reference number 125, the RAN 105 may calculate one or more data rate parameters. In some implementations, the RAN 105 may calculate the one or more data rate parameters based on the RF information, the network loading information, the mobility information, and/or the available data rate information. In some implementations, the one or more UEs 115 may transmit the SINR data, the RSRP data, and/or the RSRQ data to the RAN 105. The RAN 105 may calculate an SINR parameter based on the SINR data, an RSRP parameter based on the RSRP data, and/or an RSRQ parameter based on the RSRQ data. For example, the RAN 105 may calculate the SINR parameter based on the SINR value indicated by the SINR measurement associated with one or more UEs 115, may calculate the RSRP value based on the RSRP value indicated by the RSRP measurement associated with one or more UEs 115, and/or may calculate the RSRQ parameter based on the RSRQ value indicated by the RSRQ measurement associated with one or more UEs 115.

In some implementations, the RAN 105 may determine whether the calculated SINR parameter is a high value or a low value based on comparing the SINR parameter to an SINR threshold, may determine whether the calculated RSRP parameter is a high value or a low value based on comparing the RSRP parameter to a n RSRP threshold, and/or may determine whether the calculated RSRQ parameter is a high value or a low value based on comparing the RSRQ parameter to an RSRQ parameter threshold. As shown in FIG. 1B, the RAN 105 determines that the SINR parameter is a "low" value, determines that the RSRP parameter is a "high" value, and determines that the RSRQ parameter is a "high" value.

Additionally, or alternatively, the one or more of the UEs 115 may calculate the SINR parameter based on the SINR data, the RSRP parameter based on the RSRP data, and/or the RSRQ parameter based on the RSRQ data, and may transmit the SINR parameter, the RSRP parameter, and/or the RSRQ parameter to the RAN 105.

In some implementations, the RAN 105 may calculate a number of UEs parameter based on the number of UEs 115 indicated by the UE information, may calculate a number of network connections parameter based on the number of network connections indicated by the network connection information, and/or may calculate a PRB utilization parameter based on the number of PRBs utilized by the one or more UEs 115 indicated by the PRB utilization information.

In some implementations, the RAN 105 may determine whether the calculated number of UEs parameter is a high value or a low value based on comparing the number of UEs parameter to a number of UEs threshold, may determine whether the calculated number of network connections parameter is a high value or a low value based on comparing the number of network connections parameter to a number of connections threshold. value as a high value or a low value by comparing the number of network connections to a threshold number of network connections, and/or may determine whether the calculated PRB utilization parameter is a high value or a low value based on comparing the PRB utilization parameter to a PRB utilization threshold. As shown in FIG. 1B, the RAN 105 determines that the number of UEs parameter is a "low" value, determines that the number of network connections parameter is a "low" value, and determines that the PRB utilization parameter is a "low" value.

In some implementations, the RAN 105 may determine a RAT parameter based on the RATs indicated by the RAT information. As shown in FIG. 1B, the RAN 105 determines that the RAT parameter is a "5G" value.

In some implementations, the RAN 105 may calculate a UE speed parameter based on the UE speed value indicated by the UE speed information. As an example, the RAN 105 may determine whether the calculated UE speed parameter is a high value or a low value based on comparing the UE speed parameter to a UE speed threshold. As shown in FIG. 1B, the RAN 105 determines that the UE speed parameter is a "low" value.

In some implementations, the RAN 105 may calculate a handover parameter based on the number of handover successes indicated by the handover information. For example, the RAN 105 may calculate the handover parameter as a high value or a low value by comparing the number of handover successes to a threshold number of handover successes. As shown in FIG. 1i, the RAN 105 calculates the handover parameter as a "high" value.

In some implementations, the RAN 105 may determine a DC status based on the DC status indicated by the DC status information. As shown in FIG. 1B, the RAN 105 determines that the DC status is a "using" value.

In some implementations, the RAN 105 may determine a CA status based on the CA status indicated by the CA status information. As shown in FIG. 1, the RAN 105 determines that the CA status as a "using" value.

In some implementations, the RAN 105 may calculate the available data rate parameter based on the available data rate information. For example, the available data rate information may indicate the manner in which the RF information, the network loading information, and/or the mobility information are to be combined to calculate the available data rate. As an example, the available data rate information may indicate that the available data rate may be calculated based on the following equation: $V_j = V_{j-1} + F((\text{at least a portion of the RF information}), (\text{at least a portion of the network loading information}), \text{and } (\text{at least a portion of the mobility information})) \times \text{Delta}_j$, where $V_j$ is the available data rate for a current calculation, $V_{j-1}$ is the available data rate for a prior calculation, F is a function, and $\text{Delta}_j$ is a rate increase step value, which may be configured by a network operator. As shown in FIG. 1, the available data rate information indicates that the available data rate parameter is a function (F) of one or more parameters and a rate increase step value, shown as "Available data rate parameter=F(RF parameters, network loading parameters, and mobility parameters)×0.7" where the RF parameters are based on the RF information, the network loading parameters are based on the network loading information, the mobility parameters are based on the mobility information, and 0.7 is the rate step increase value (e.g. $\text{Delta}_j$).

Figure 1C:
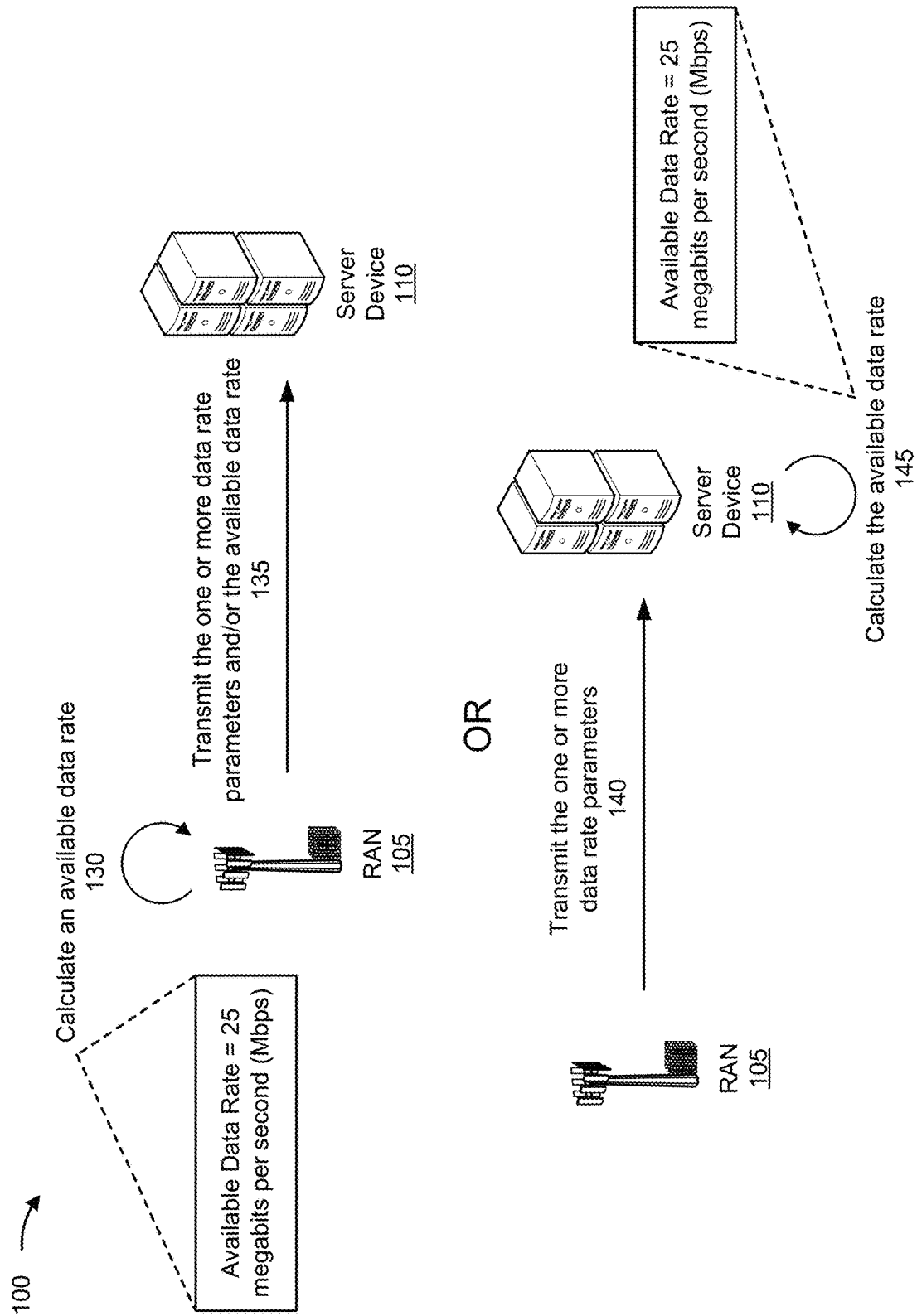

As shown in FIG. 1C, and by reference number 130, the RAN 105 may calculate an available data rate. In some implementations, the RAN 105 may calculate the available data rate based on the function indicated by the available data rate parameter, such as by using the values and/or numbers associated with the parameters indicated by the function. As shown in FIG. 1C, the RAN 105 may calculate the available data rate as "25 megabits per second (Mbps)."

As shown by reference number 135, the RAN 105 may transmit the one or more data rate parameters and/or information that identifies the available date rate to the server device 110. For example, the RAN 105 may transmit one or more of the RF parameters, one or more of the network loading parameters, one or more of the mobility parameters, the available data rate parameter, and/or information that identifies the available data rate to the server device 110.

Alternatively, as shown by reference number 140, the RAN 105 may transmit the one or more data rate parameters to the server device 110. In other words, the RAN 105 may transmit the one or more data rate parameters rather than the one or more data rate parameters and the information that identifies the available data rate to the server device 110.

As shown by reference number 145, the server device 110 may calculate the available data rate based on the function indicated by the available data rate parameter, such as by using the values and/or numbers associated with the parameters indicated by the function. As shown in FIG. 1C, the server device 110 may calculate the available data rate as "25 megabits per second (Mbps)." Thus, the RAN 105 or the server device 110 may calculate the available data rate.

Figure 1D:
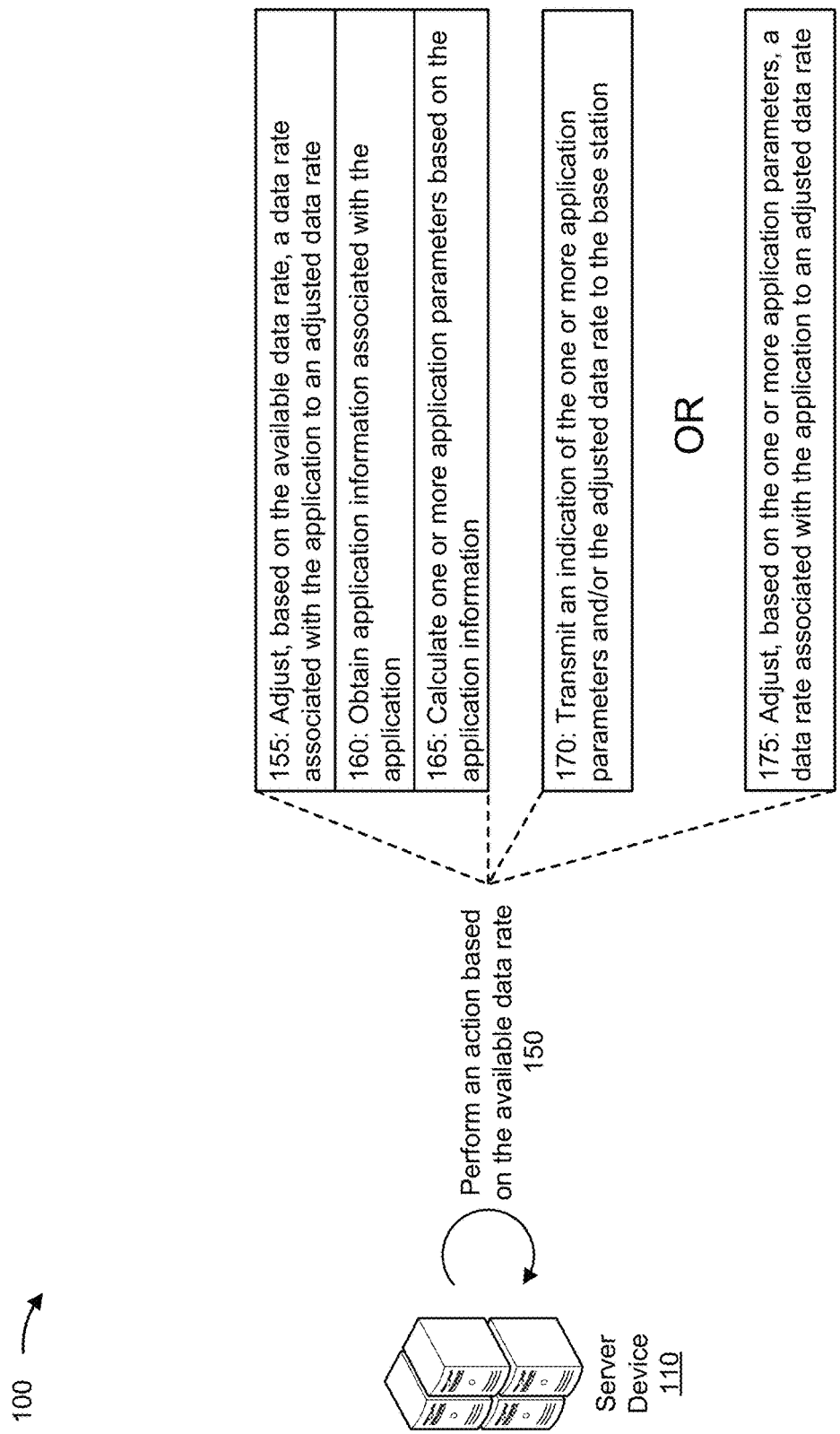

As shown in FIG. 1D, and by reference number 150, the server device 110 may perform an action based on the available data rate. In some implementations, the action performed by the server device 110 may be associated with the data rate, as described in more detail elsewhere herein.

As shown by reference number 155, the server device 110 may adjust, based on the available data rate, a data rate associated with the application to an adjusted data rate. In some implementations, the server device 110 may increase or decrease the data rate associated with the application based on the available data rate. For example, if the date rate associated with the application is 8 Mbps, and if the available data rate is 25 Mbps, then the server device 110 may increase the data rate of 8 Mbps to the adjusted data rate of 25 Mbps. In this way, the server device 110 may receive feedback from the RAN 105, and may update the data rate associated with the application based on the feedback. As a result, the server device 110 may implement the adjustments to the data rate associated with the application without compensating for the end-to-end delay associated with end-to-end measurements.

In some implementations, the data rate associated with the application may be an estimated data rate associated with the application. For example, the RAN 105 may obtain historical data rate information associated with the RAN 105, such as historical RF information, historical network loading information, and/or historical mobility information associated with the RAN 105. For example, the historical RF information may include historical RF conditions associated with a location (e.g., RF conditions associated with the RAN 105 at a particular geolocation), the historical network loading information may include historical fixed loading values associated with the RAN 105 (e.g., fixed loading values associated with the RAN 105 over time period), and/or the historical mobility information may include historical mobility conditions associated with a location (e.g., historical mobility conditions associated with a particular geolocation).

The RAN 105 may calculate the estimated data rate based on the historical information and may transmit information that identifies the estimated data rate to the server device 110. The server device may adjust a data rate associated with the application to the estimated data rate. Thus, in some implementations, the server device 110 may set the data rate associated with the application to the estimated data rate and adjust the estimated data rate to the adjusted data rate associated with the application. In this way, an initial data rate associated with the application may be more accurate, which may enable smaller subsequent adjustments to be made.

As an example, the initial data rate associated with the application may be calculated based on the following equation: $V_o = p(RF@geobin, a\text{-priori loading}, mobility@geobin)$, where $V_o$ is the initial data rate, p is a function, RF@geobin is an RF condition (e.g., a historical RF condition) associated with a particular geolocation, a-priori loading is a fixed loading value (e.g., a historical fixed loading value), and mobility@geobin is a mobility condition (e.g., a historical mobility condition) associated with a particular geolocation. As shown by reference number 160, the server device 110 may obtain application information associated with the application. For example, the application information associated with the application may include settings information, such as a codec type, an application type, an application server type, a download speed, an upload speed, and/or a ping rate, among others.

As shown by reference number 165, the server device 110 may calculate one or more application parameters based on the application information. For example, the server device 110 may calculate (e.g., based on the settings information) a codec type parameter, an application type parameter, an application server type parameter, a download speed parameter, an upload speed parameter, and/or a ping rate parameter. As an example, the server device 110 may calculate the codec type parameter as "video codec: H.264 (Advanced Video Coding)," may calculate the application type parameter as "cloud game," may calculate the application server type parameter as "cloud gaming server," may calculate the download speed parameter as "25 Mbps," may calculate the upload speed parameter as "6 Mbps," and/or may calculate the ping rate parameter as "less than 50 milliseconds (ms)."

As shown by reference number 170, the server device 110 may transmit an indication of the one or more application parameters and/or the adjusted data rate to the RAN 105. In some implementations, the RAN 105 may transmit the one or more data rate parameters to the server device 110 and/or the available data rate as recommended data rate information. As an example, the server device 110 may provide the application information to the RAN 105 in response to receiving the recommended data rate information.

In some implementations, the server device 110 may analyze the information indicated by the recommended data rate information, may adjust the data rate associated with the application based on the information indicated by the recommended data rate information, and/or may provide the application information to the RAN 105 as feedback information. The RAN 105 may update, based on the application information, at least a portion of the recommended data rate information based on the application information, such as by calculating an updated recommended available data rate. The RAN 105 may transmit the updated recommended available data rate to the server device 110. The server device 110 may adjust the data rate associated with the application based on the updated recommended available data rate.

In some implementations, the server device 110 and the RAN 105 may exchange information via one or more application programming interfaces (APIs). For example, the RAN may transmit the one or more data rate parameters and/or the available data rate via a first API, and the server device 110 may transmit the application information to the RAN 105 via a second API.

Alternatively, as shown by reference number 175, the server device 110 may calculate, based on the one or more application parameters, an updated available data rate. As an example, the server device 110 may adjust, based on the updated available data rate, a data rate associated with the application to an adjusted data rate associated with the application (e.g., the adjusted data rate based on the available data rate calculated by the RAN 105 or the server device 110).

In this way, the implementations described herein consume fewer computing resources, processing resources, memory resources, communication resources, networking resources, and/or other resources that would otherwise have been consumed in frequently adjusting the data rate because of delays associated with end-to-end measurements, retransmitting data associated with packet loss, and/or by unnecessarily adjusting the data rate. Furthermore, a greater number of factors that may affect the data rate associated with the application may be considered relative to factors limited to factors associated with only end-to-end measurements, resulting in a more accurate data rate determination. For example, the implementations described herein may consider factors, such as radio condition factors (e.g., radio frequency (RF) condition factors), loading factors (e.g., network loading factors), and/or mobility factors, that are typically not available through only end to end measurements. As a result, the implementations described herein may more efficiently utilize resources, such as an available bandwidth radio resource, and/or may more accurately determine a data rate.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
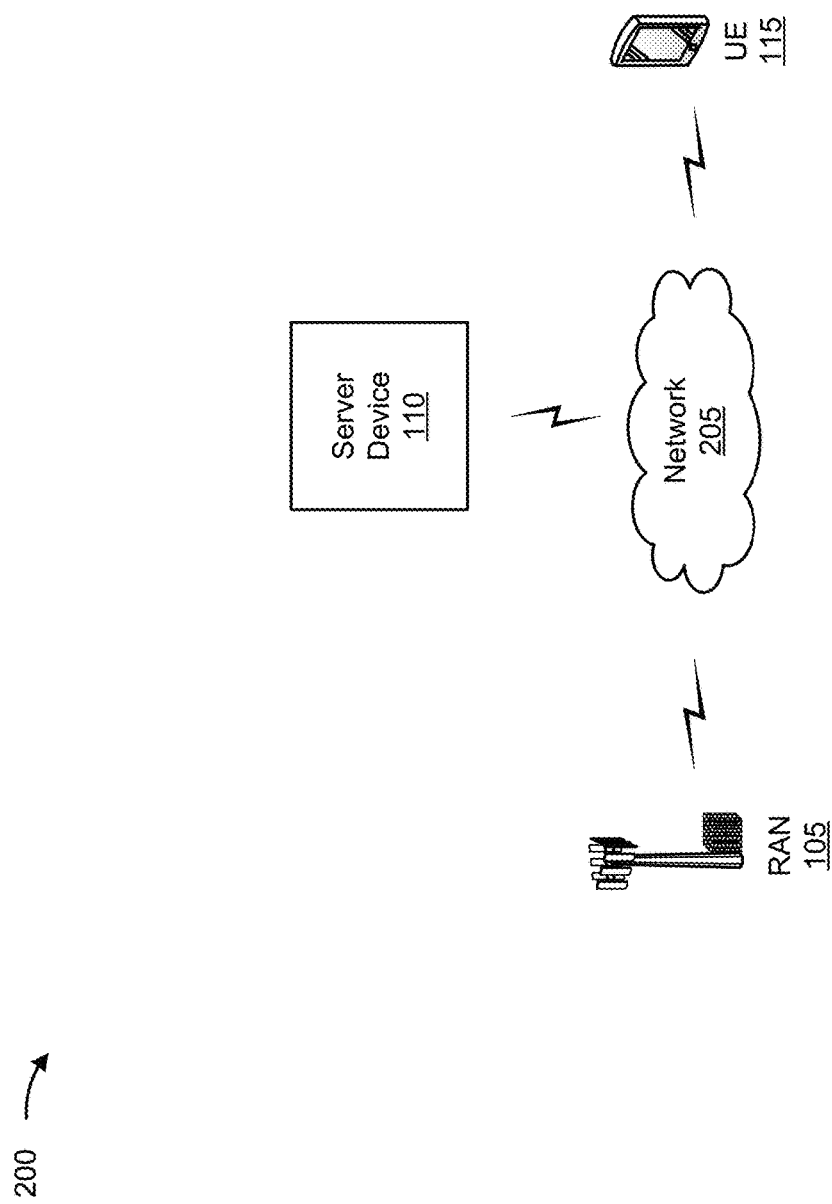
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a RAN 105, a server device 110, one or more UEs 115, and a network 205. Devices of environment 200 may interconnect via wired connections, wireless connections, or a combination of wired and wireless connections.

The RAN 105 may support, for example, a cellular radio access technology (RAT). The RAN 105 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 105 may transfer traffic between the UE 105 (e.g., using a cellular RAT), one or more base stations (e.g., using a wireless interface or a backhaul interface, such as a wired backhaul interface), and/or a core network. The RAN 105 may provide one or more cells that cover geographic areas.

In some implementations, the RAN 105 may perform scheduling and/or resource management for the UE 105 covered by the RAN 105 (e.g., the UE 105 covered by a cell provided by the RAN 105). In some implementations, the RAN 105 may be controlled or coordinated by a network controller, which may perform load balancing, network-level configuration, and/or other operations. The network controller may communicate with the RAN 105 via a wireless or wireline backhaul. In some implementations, the RAN 105 may include a network controller, a self-organizing network (SON) module or component, or a similar module or component. In other words, the RAN 105 may perform network control, scheduling, and/or network management functions (e.g., for uplink, downlink, and/or sidelink communications of the UE 105 covered by the RAN 105).

The server device 110 may include one or more devices capable of receiving, generating, storing, processing, providing, and/or routing information associated with data rate adaptation based on RAN recommendations, as described elsewhere herein. The server device 110 may include a communication device and/or a computing device. For example, the server device 110 may include a server, such as an application server, a client server, a web server, a database server, a host server, a proxy server, a virtual server (e.g., executing on computing hardware), or a server in a cloud computing system. In some implementations, the server device 110 may include computing hardware used in a cloud computing environment.

The UE 115 may include one or more devices capable of receiving, generating, storing, processing, and/or providing information associated with data rate adaptation based on RAN recommendations, as described elsewhere herein. The UE 115 may include a communication device and/or a computing device. For example, the UE 115 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 205 may include one or more wired and/or wireless networks. For example, the network 205 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 205 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
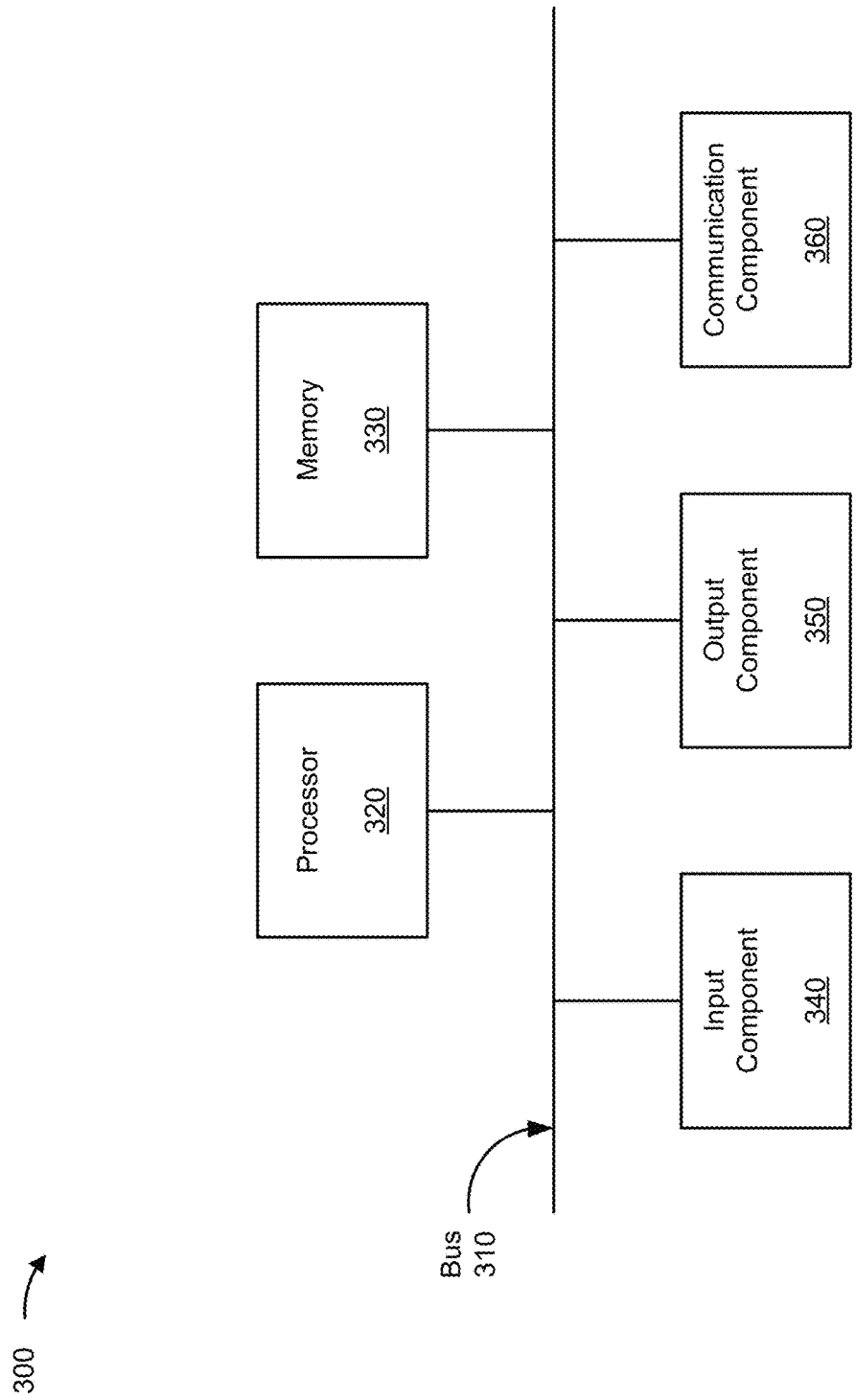
FIG. 3 is a diagram of example components of a device associated with data rate adaptation based on RAN recommendations.

FIG. 3 is a diagram of example components of a device 300 associated with data rate adaptation based on RAN recommendations. The device 300 may correspond to the RAN 105 (e.g., a base station), the server device 110, and/or the UE 115. In some implementations, the RAN 105 (e.g., a base station), the server device 110, and/or the UE 115 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection).

The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with data rate adaptation based on RAN recommendations. In some implementations, one or more process blocks of FIG. 4 may be performed by a RAN (e.g., RAN 105). In some implementations, one or more process blocks of FIG. 4 may be performed by another device or a group of devices separate from or including the RAN 105, such as the server device 110. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include obtaining data rate information (block 410). For example, the RAN 105 may obtain data rate information based on communications with the server device 110 and/or the UEs 115. The server device 110 may be associated with an application and the data rate information may be associated with the application, as described above.

As further shown in FIG. 4, process 400 may include determining, based on the data rate information, one or more data rate parameters associated with the application (block 420). As an example, the one or more data rate parameters may include at least one of one or more RF parameters, one or more network loading parameters, one or more mobility parameters, or an available data rate parameter.

For example, the one or more RF parameters may include at least one of an SINR parameter, an RSRP parameter or an RSRQ parameter, the one or more network loading parameters may include at least one of a number of user UEs parameter, a number of network connections parameter, or a PRB parameter, and/or the one or more mobility parameters may include at least one of a RAT parameter, one or more user equipment speed parameters, one or more handover parameters, a dual connectivity parameter, or a carrier aggregation parameter.

As an example, the RAN 105 may determine an available data rate associated with the application based on the available data rate parameter.

As further shown in FIG. 4, process 400 may include transmitting the one or more data rate parameters (block 430). For example, the RAN 105 may transmit the available data rate to the server device 110. The RAN 105 may receive, form the server device 110, an indication of an adjusted data rate associated with the application that is based on the available data rate. As an example, the adjusted data rate may be adjusted from an estimated data rate associated with the application.

In some implementations, the available data rate parameter indicates a recommended available data rate associated with the application. As an example, the RAN 105 may receive, from the server device 110, one or more application parameters associated with the application. The RAN 105 may determine, based on the one or more application parameters, an updated recommended available data rate. The RAN 105 may transmit the updated recommended available data rate to the server device 110. As an example, the RAN 105 may receive, from the server device 110, an indication of an adjusted data rate associated with the application that is based on the updated recommended available data rate.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   obtaining, by a base station of a radio access network (RAN), from a server device, data rate information based on communication between the base station and the server device,
      wherein the server device is associated with an application, and
      wherein the data rate information is associated with the application;
   determining, by the base station and based on the data rate information, one or more data rate parameters associated with the application, wherein the one or more data rate parameters include at least one of:
      one or more radio frequency parameters,
      one or more network loading parameters,
      one or more mobility parameters, or
      an available data rate parameter; and
   transmitting, by the base station and to the server device, the one or more data rate parameters.

2. The method of claim 1, further comprising:
   determining, by the base station and based on the available data rate parameter, an available data rate associated with the application; and
   transmitting, by the base station and to the server device, the available data rate.

3. The method of claim 2, further comprising:
   receiving, by the base station and from the server device, an indication of an adjusted data rate associated with the application,
      wherein the adjusted data rate is based on the available data rate.

4. The method of claim 3, wherein the adjusted data rate is adjusted from a data rate associated with the application, and
   wherein the data rate is an estimated data rate.

5. The method of claim 1, wherein the one or more radio frequency parameters include at least one of:
   a signal to interference noise ratio parameter, a reference signal received power parameter, or
a reference signal received quality parameter.

6. The method of claim 1, wherein the one or more network loading parameters include at least one of:
a parameter that indicates a number of user equipments,
a number of network connections parameter, or
a physical resource block utilization parameter.

7. The method of claim 1, wherein the one or more mobility parameters include at least one of:
a radio access technology parameter,
one or more user equipment speed parameters,
one or more handover parameters,
a dual connectivity parameter, or
a carrier aggregation parameter.

8. The method of claim 1, wherein the available data rate parameter indicates a recommended available data rate associated with the application, and the method further comprising:
obtaining, by the base station and from the server device, one or more application parameters associated with the application;
determining, based on the one or more application parameters, an updated recommended available data rate; and
transmitting, by the base station, the updated recommended available data rate to the server device.

9. The method of claim 8, further comprising:
receiving, by the base station and from the server device, an indication of an adjusted data rate associated with the application,
wherein the adjusted data rate is based on the updated recommended available data rate.

10. The method of claim 8, wherein the one or more application parameters include at least one of:
a codec type parameter,
an application type parameter, or
an application server type parameter.

11. A device, comprising:
one or more processors configured to:
obtain, from a base station of a radio access network (RAN) communicably coupled to the device, one or more data rate parameters based on communication between the base station and the device,
wherein the device is associated with an application, and
wherein the one or more data rate parameters are associated with the application;
determine, based on the one or more data rate parameters, an available data rate associated with the application; and
perform an action based on the available data rate.

12. The device of claim 11, wherein the available data rate is a function of at least one of the one or more data rate parameters.

13. The device of claim 11, wherein the one or more processors, to perform the action based on the available data rate, are configured to:
adjust, based on the available data rate, a data rate associated with the application to an adjusted data rate associated with the application.

14. The device of claim 13, wherein the data rate associated with the application is an estimated data rate.

15. The device of claim 11, wherein the one or more data rate parameters includes one or more mobility parameters.

16. The device of claim 11, wherein the one or more processors are further configured to:
obtain application information associated with the application;
determine, based on the application information, one or more application parameters associated with the application; and
determine, based on the one or more application parameters, an updated available data rate.

17. The device of claim 16, wherein the one or more processors are further configured to:
adjust, based on the updated available data rate, a data rate associated with the application to an adjusted data rate associated with the application.

18. A non-transitory computer-readable medium storing a set of instructions, the set of instructions comprising:
one or more instructions that, when executed by one or more processors of a base station in a radio access network (RAN) communicably coupled to a server device, cause the base station to:
obtain data rate information based on communication between the base station and the server device,
wherein the server device is associated with an application, and
wherein the data rate information is associated with the application;
determine, based on the data rate information, one or more data rate parameters associated with the application, wherein the one or more data rate parameters include at least one of:
one or more radio frequency parameters,
one or more network loading parameters,
one or more mobility parameters, or
an available data rate parameter; and
transmit, to the server device, the one or more data rate parameters.

19. The non-transitory computer-readable medium of claim 18, wherein the one or more instructions, when executed by the one or more processors, further cause the base station to:
determine, by the base station and based on the available data rate parameter, an available data rate associated with the application; and
transmit, by the base station and to the server device, the available data rate.

20. The non-transitory computer-readable medium of claim 19, wherein the available data rate parameter is a function of at least one of:
the one or more radio frequency parameters,
the one or more network loading parameters, and
the one or more mobility parameters.

\* \* \* \* \*